United States Patent [19]

Hikota et al.

[11] 3,874,257

[45] Apr. 1, 1975

[54] TOOL HEAD FOR A TURNING MACHINE

[75] Inventors: Yuji Hikota; Shizuki Yoshino; Atushi Ohtani, all of Abikoshi, Japan

[73] Assignees: Hitachi Seiki Co., Ltd., Tokyo, Japan

[22] Filed: Mar. 6, 1974

[21] Appl. No.: 448,754

[52] U.S. Cl. .................... 82/36 A, 29/27, 29/39, 29/41
[51] Int. Cl. ............................................. B23b 29/32
[58] Field of Search ............ 82/36 A; 29/39, 27, 41, 29/52, 54

[56] References Cited
UNITED STATES PATENTS

| | | | |
|---|---|---|---|
| 2,534,333 | 12/1950 | Wyrick | 82/36 A |
| 2,913,807 | 11/1959 | Bechler | 29/41 |
| 3,750,245 | 8/1973 | Kennedy | 29/39 |
| 3,786,539 | 1/1974 | Foll et al. | 29/27 |

FOREIGN PATENTS OR APPLICATIONS

| | | | |
|---|---|---|---|
| 1,136,884 | 8/1957 | Germany | 82/36 A |

*Primary Examiner*—Leonidas Vlachos
*Attorney, Agent, or Firm*—Wenderoth, Lind & Ponack

[57] ABSTRACT

A tool head in a turning machine comprising:

a turret supporting base mounted on a sliding base movable in parallel and at right angle a main axial line spindle in respect to an axial line of a spindle, a drum-type turret provided on the supporting base so as to effect indexing around an axial line parallel to the main axial line of the supporting base, an outside diameter cutting tool provided at a front large-diameter portion of the turret, an inside diameter cutting tool provided movable in parallel to the rotating axial line and extending through the turret, a power driving device for the indexing of the turret, a power driving device which engages with one of the inside diameter cutting tools which is indexed and projects it beyond the front end of the turret and returns it to its original position, and a power clamping device which effects clamping for determining the indexing position of the turret and clamping of the required inside diameter cutting tool.

1 Claim, 15 Drawing Figures

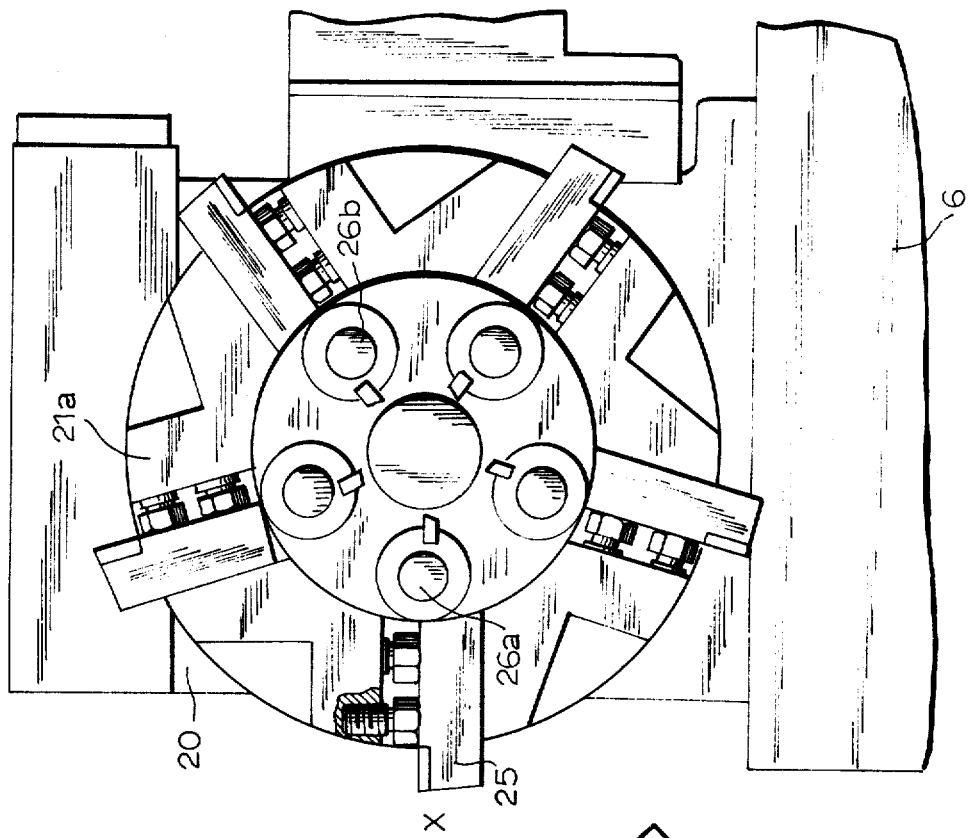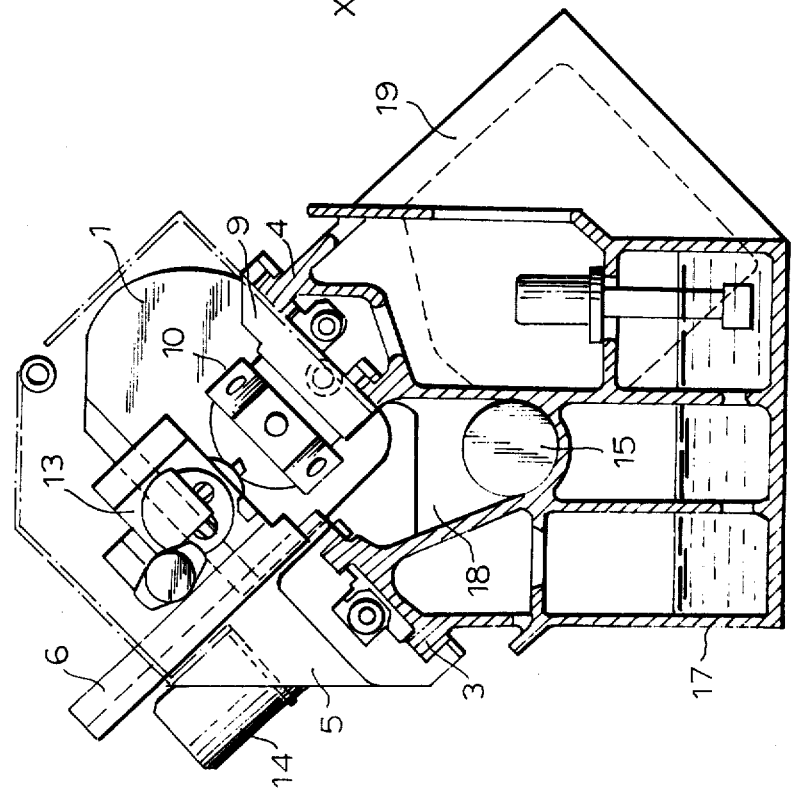

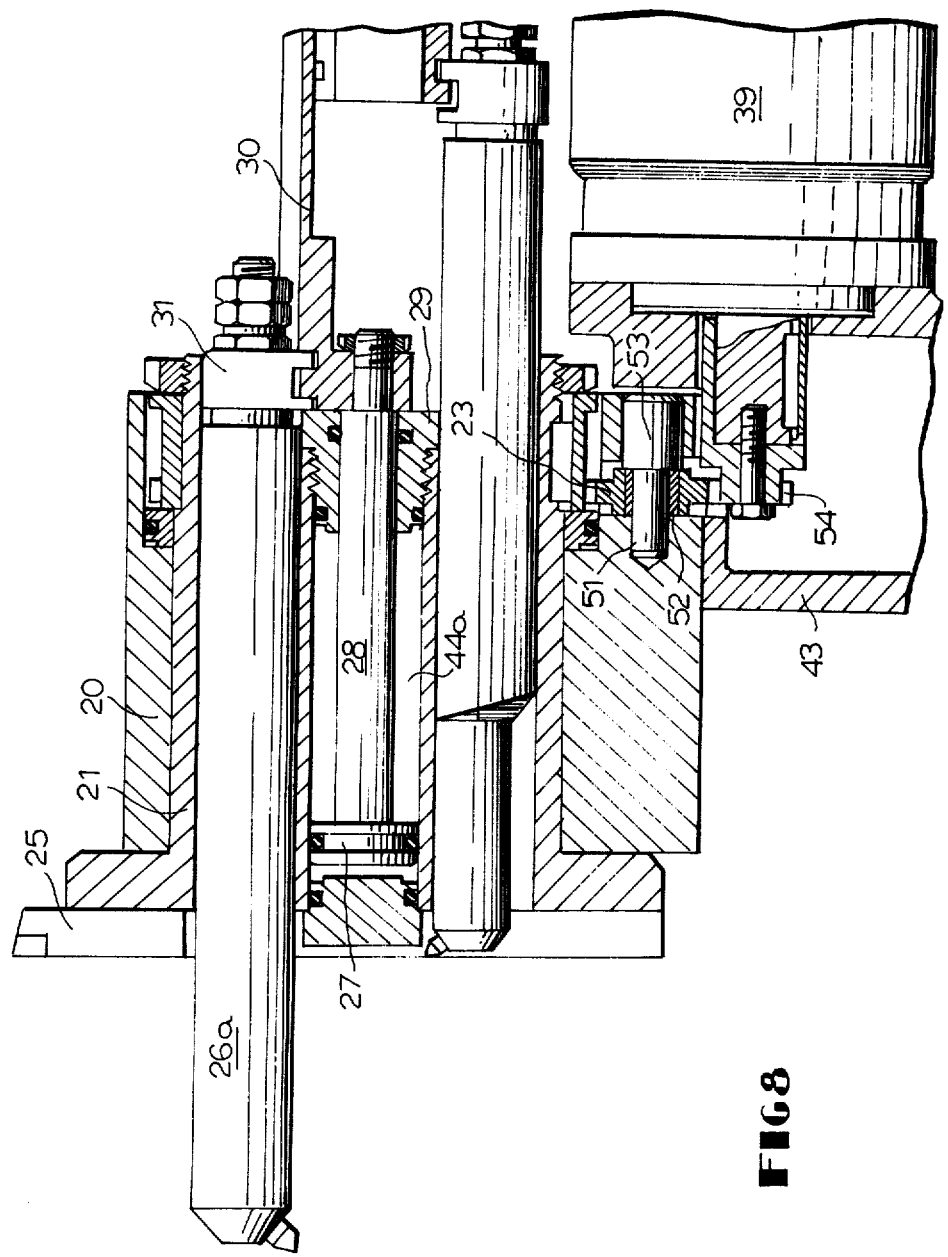

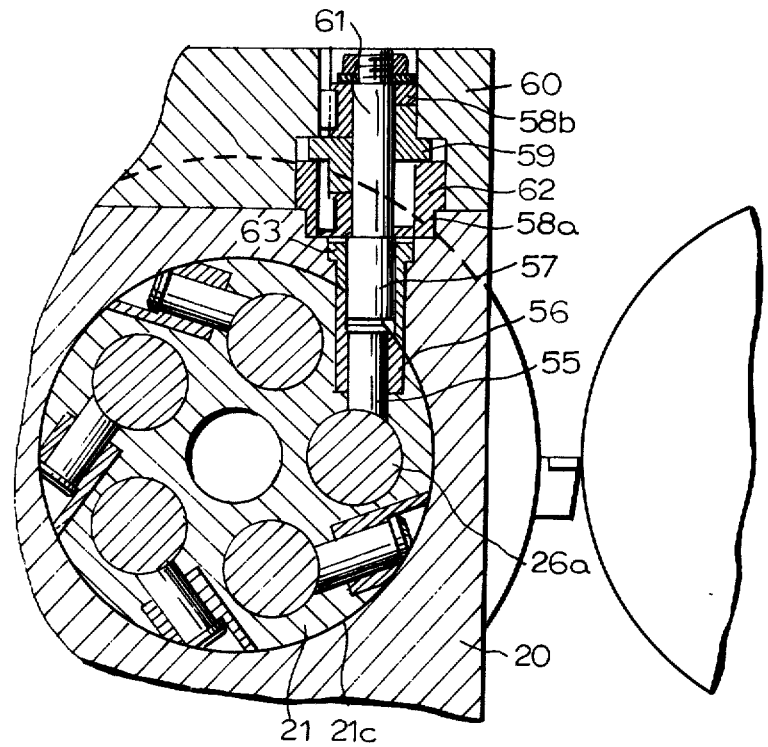
FIG.10
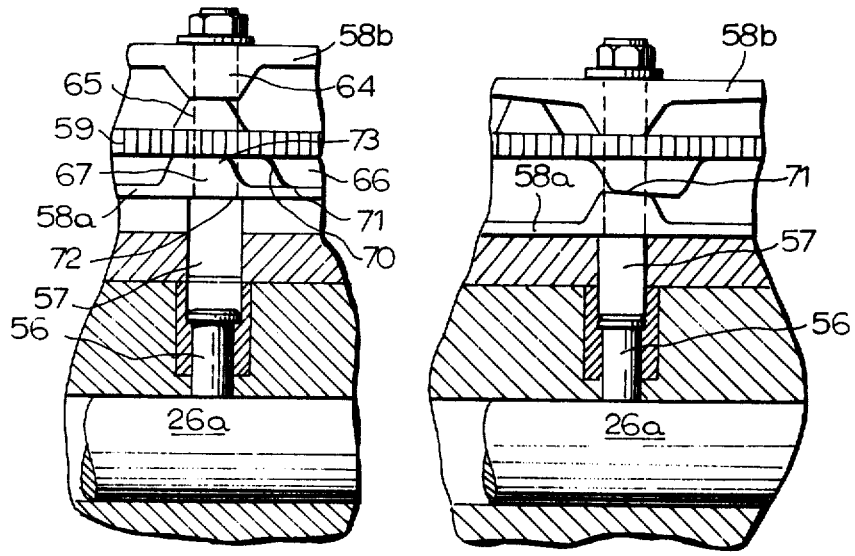
FIG.11  FIG.12

TOOL HEAD FOR A TURNING MACHINE

The present invention relates to a tool head in a turning machine.

In the field of the modern turning works, tries have been made for improving considerably the production efficiency of machine tools by realizing combined machining composed of outside diameter cutting and drilling by an automatic machine tool, particularly by a numerically controlled machine tool. In order to perform the combined machining, efficiently, it is desirable that each of the tool head for the outside diameter cutting and the tool head for the inside diameter cutting has independent cutting cycle, and it is necessary that there is less interference between individual tool heads within the range of action required by the individual tool heads for performing the cutting, and their course of action must be free.

Also in order to follow easily the change in the position of the tool at the time of combined machining, it is necessary to keep the number of the driving shafts of each tool head as small as possible. In view of the above requirements of a tool head, it is desirable that both a tool for cutting an outside diameter and a tool for cutting an inside diameter are provided on the above tool head for cutting the outside diameter.

Conventionally several types of the above tool heads have been put in practical use, but all of the conventional tool heads have various problems such as enlargement of the tool head, tool arrangement easily causing lack of rigidity, limitation of the tool length due to interference between the headstock and the tool for cutting the inside diameter which projects towards the headstock, over-hang of the spindle bearing for avoiding the interference, and lowering of rigidity due to the over-hang.

The object of the present invention is to provide a tool head for turning machine tools which is characterized in that a turret tool head having a drum-shaped turret on a sliding member movable in parallel and at a right angle to the axial line of a spindle is provided so that the drum-shaped turret is allowed to rotate around the axial line parallel to the axial line of the spindle, that a plurality of tools for outside diameter cutting are provided at the large-diameter front portion of the drum-shaped turret, tools for inside diameter cutting are provided extending through the above drum-shaped turret movable in parallel to the axial line of the spindle, so that at the time of the outside diameter cutting, combined cutting is made possible by advancing a tool head for inside diameter machining, movable along the axial line of the spindle, into a clearance formed by difference between the distance of the axial line of the spindle to the tool top and the difference from the axial line to the side of the turret supporting member by using the outside diameter cutting tool, while at the time of inside diameter cutting, only the necessary inside diameter cutting tool or tools is projected in a required amount from the front-end portion of the drum-shaped turret to effect the inside diameter cutting of a work piece without interference with other tools. Thus the tool head of the present invention can hold a number of outside and inside diameter cutting tools and can be constructed with a compact structure.

Other objects and features of the present invention will be clear from the following descriptions referring to the attached drawings.

FIG. 2 is a cross sectional view at a right angle to the main axial line of a slant bed type numerically controlled turret lathe.

FIG. 3 is a front view showing a tool holding portion of a cross tool head in an embodiment of the present invention.

Figure 7A:
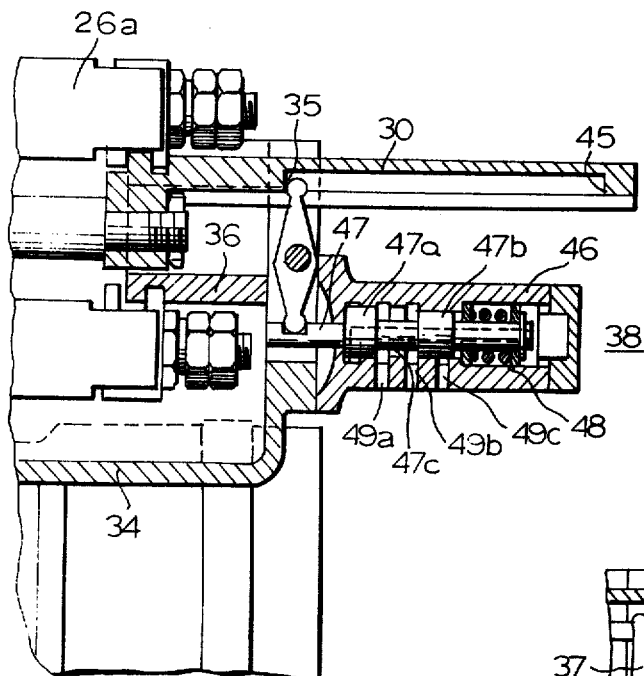
Figure 7B:
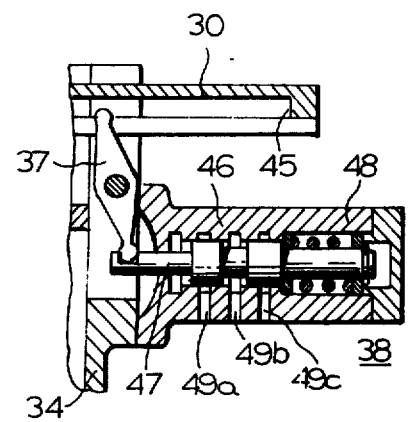

FIGS. 7-a and 7-b show respectively a longitudinal section of a change-over valve according to the present invention.

FIG. 8 shows a longitudinal section of an indexing mechanism for turning a drum-shaped turret mounted on a cross tool head in one embodiment of the present invention.

Figure 9:
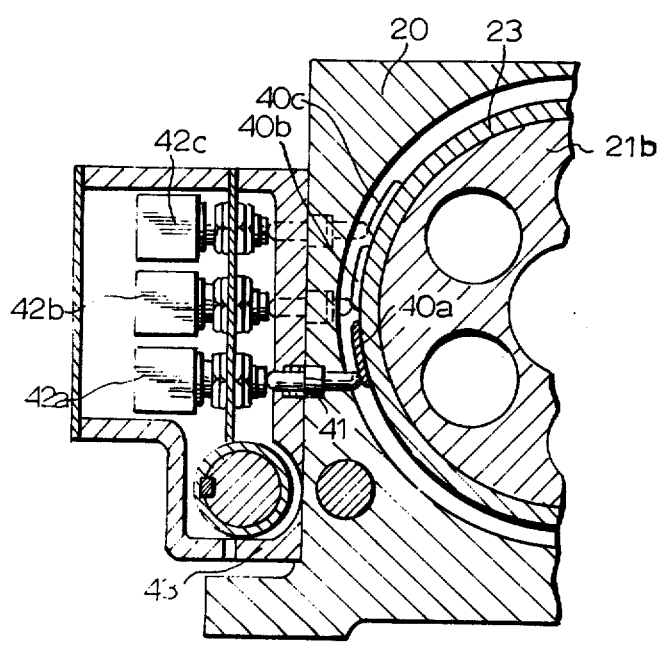

FIG. 9 shows a cross section of a reading device including a limit switch for reading the holding position of a tool head at the front large diameter portion of the drum-shaped turret.

FIG. 10 shows a cross section of a clamp mechanism for determining the indexing position of the drum-shaped turret.

FIGS. 11 and 12 show respectively the clamping and unclamping by the clamp mechanism for determining the dividing position of the drum-shaped turret.

Figure 13:
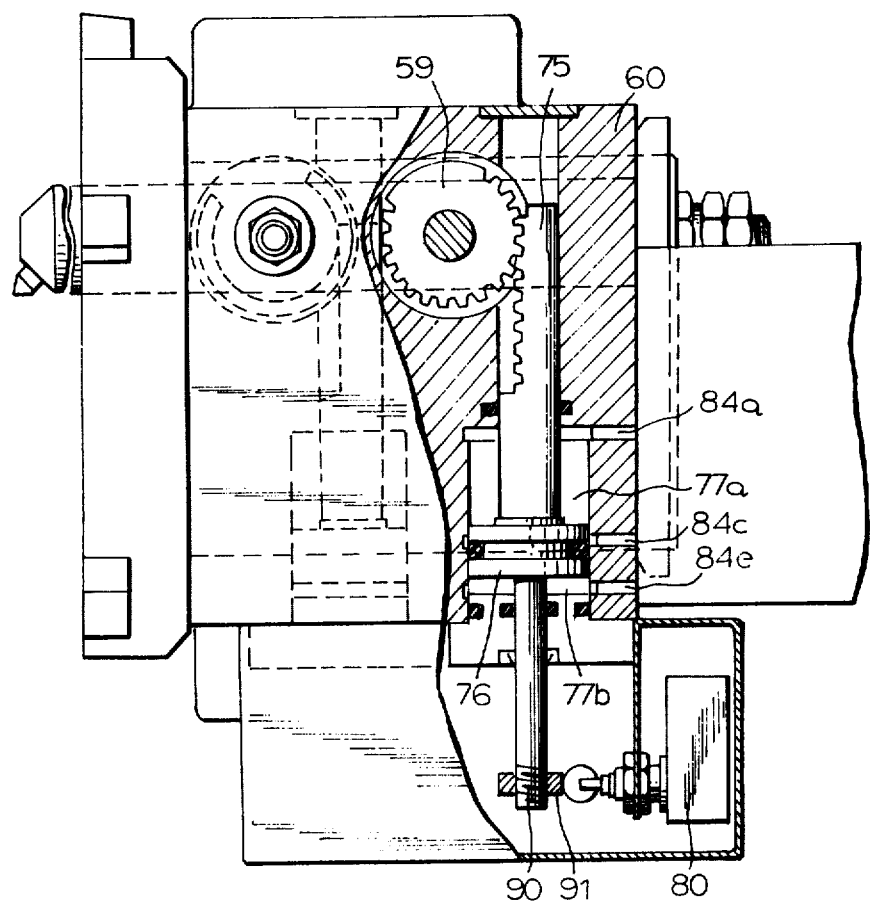

FIG. 13 shows a longitudinal section of driving the clamp mechanism for determining the indexing position.

Figure 14:
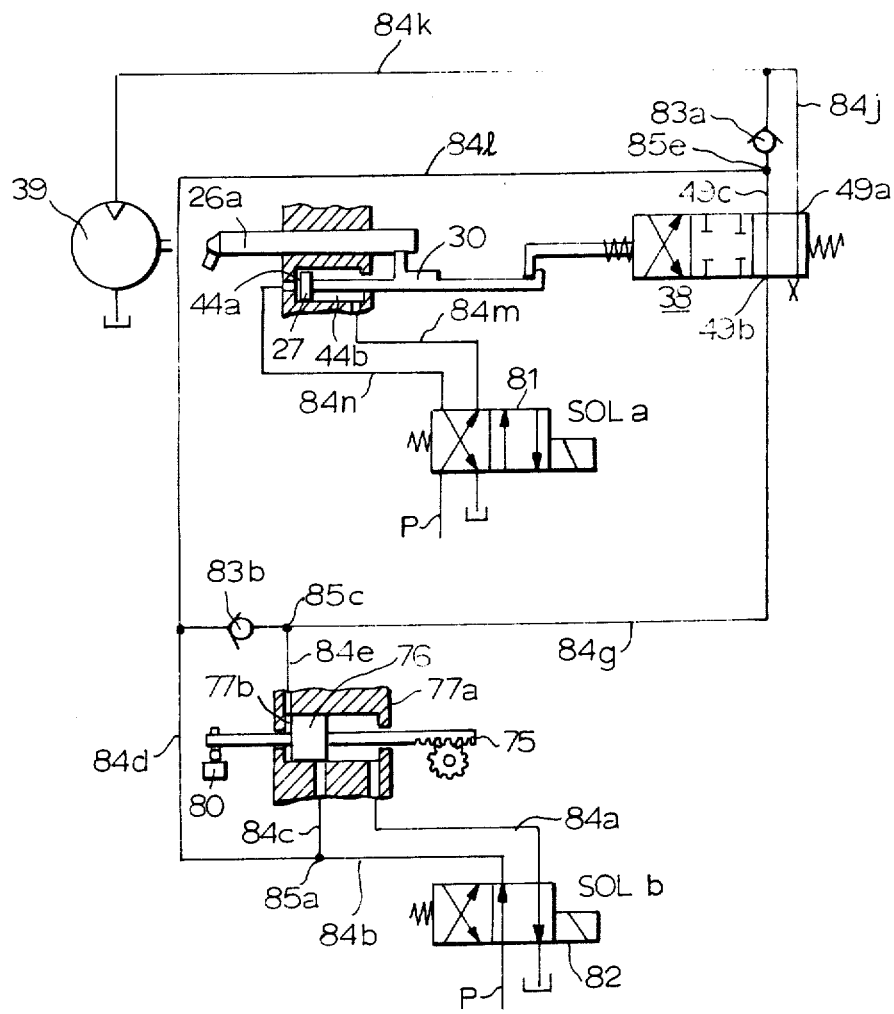

FIG. 14 shows a hydraulic circuit for a hydraulic system for operating the cross tool head.

Figure 1:
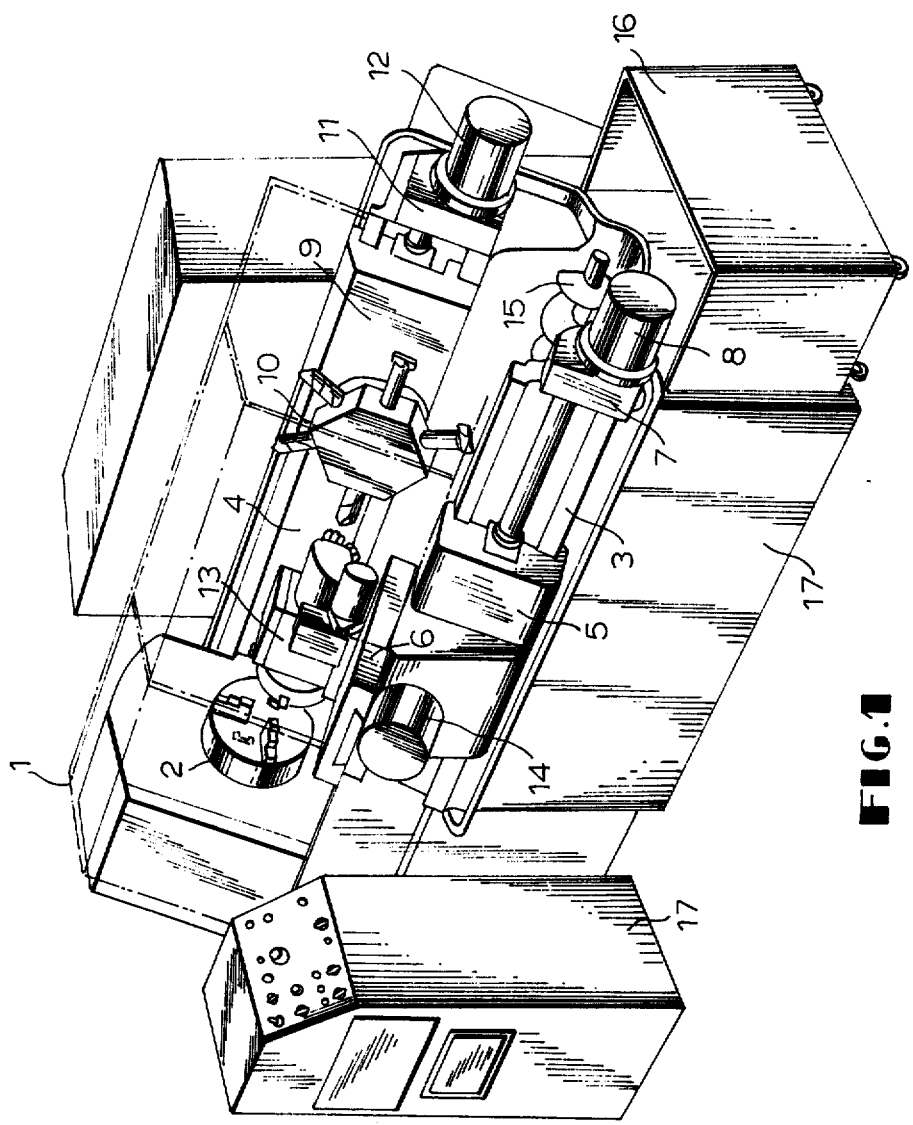
FIG. 1 is a general view of a slant bed type numerically controlled turret lathe on which a tool head according to the present invention is mounted.
Figure 6:
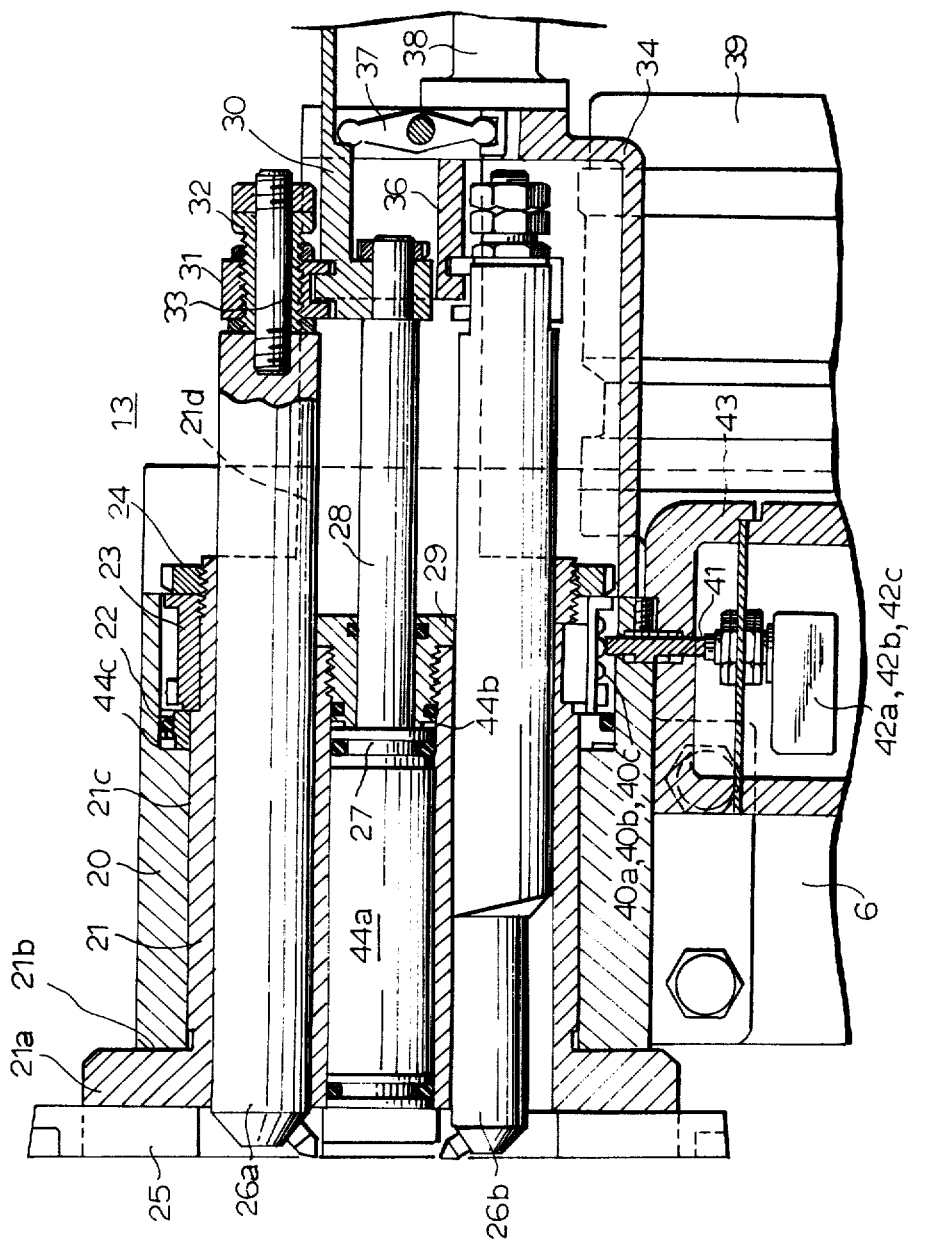
FIG. 6 shows a longitudinal section of a cross tool head according to the present invention.

In FIGS. 1 and 2 showing a slant bed type numerically controlled turret lathe provided with a tool head of the present invention. The first guide face 3 is provided slantly on a bed 17 of the turret lathe along the axial line of a spindle of a headstock 1 and the second guide face 4 is provided also on the bed 17 in parallel to the guide face 3 and at an opposite position to that of the guide face 3 in respect to the axial line of the spindle. On the first guide face 3, the first sliding member (hereinafter called "carriage 5") is provided slidably in parallel to the axial line of the spindle, and the second sliding member (hereinafter called "cross slide 6") which slides in a direction perpendicular to the first guide face 3 and at right angles with the axial line of the spindle is provided slidably on the carriage 5. The carriage 5 is driven by the second driving motor 8 mounted on the bed 17 near the first guide face 3, while the cross slide 6 is driven by the third driving motor 14 mounted on the carriage 5. On the cross slide 6, a drum-shaped turret tool head (hereinafter called "cross tool head 13") is mounted, and the cross tool head 13 is used for cutting the outside and inside diameters of a work piece held by a chock 2. Further, a saddle 9 is provided slidably on the second guide face 4 along the axial line of the spindle, and the saddle 9 bears turnably a turret tool head 10 holding radially a plurality (five in the example) of inside diameter cutting tools (for example a drill, a blade cutter, etc.) and the saddle 9 is driven by the second driving motor 12 mounted on the bed 17 near the second guide face 4. As shown in FIG. 2, a chip reservoir 18 is provided within the bed 17 between the first guide face 3 and the second guide face 4 and chips falling down as cutting is being performed, can be taken away into a chip box 16 outside the machine by a screw conveyer 15 provided in the chip reservoir 18. As the cross slide 6 and the saddle 9 are provided slantly in an inverted triangle form, the chip drops down in the chip reservoir 18 along their slopes respectively. The cross tool head 13 mounted on the cross slide 6 has a structure as shown in FIGS. 3, 6, 7-a, 7-b, 8, 9, 10 and 13, and five outside diameter cutting tools (for example an outside diameter cutting tool, a chamfering tool and a recessing tool, etc.) 25 are attached radially as shown in FIG. 3 on the large-diameter front portion of the drum-shaped turret. In the embodiment of the present invention, the tools 25 are attached in a manner as shown, but the present invention should not be limited to this mode of attachment and various modifications can be made without deviating from the object of the present invention. Also the number of the tools should not be limited to the number shown in the example. The drum-shaped turret 21 is supported turnably around the axial line parallel to the axial line of the spindle by a turret supporting base 20 fixed on the cross slide 6, and a piston 22 is inserted in the rear portion of the drum-shaped turret 21 and an oil pressure chamber 44c is formed between the piston 22 and the turret supporting base 20.

When oil pressure is effected to the oil pressure chamber 44c, the rear edge face 21b of the front large-diameter portion 21a is pressed onto the front face of the turret supporting base 20.

A gear 23 having dogs 40a, 40b and 40c for coding the numerical number of the tool holding positions on its outer circumference is fixed to the drum-shaped turret 21 in the rear of the piston 22. The drum type turret 21 has six holes passing therethrough equally spaced on a pitch circule having its center on the rotating axial line of the turret, and the inside diameter cutting tool 26a and 26b (for example a boring bar) is inserted slidably in the holes and can be removed from the holes when it is not necessary. At a position corresponding to the rotating axial line of the drum-type turret 21, the piston 27 is inserted together with a rod 28. At the right end of the rod 28, a shifter 30 is fixed, which can be engaged or disengaged at the end of backward stroke of the rod 28 with the groove 33 of the position determining block 31 attached to the right end of the boring bar 26a or 26b.

The position determining block 31 is adjusted in its movement to some degree in the lengthwise direction of the boring bar 26a or 26b by an adjusting screw 32 so that the projection amount of the boring bar which is established when the block 31 is pressed onto the side wall of a stop end cover 29 holding the rod 28 can be adjusted finely by the advance of the piston 27.

The engagement of the shifter 30 with the groove of the position determining block 31 is made only in respect of the boring bar 26a at the point x in FIG. 3 and the boring bar 26b inserted in the other hole is engaged with a stopper ring 36 fixed to end cover 34 at the rear portion of the turret supporting base 20 in FIG. 6 and thus does not slide. When the position determining block 31 moves together with the boring bar, it is always engaged with the guide groove 21d provided at the rear portion of the shaft portion 21c of the drum type turret so that the boring bar is prevented from rotating and the position of the tool top is maintained precisely. As shown in FIG. 7-a, a change-over valve 38 is attached to the end cover 34, and the change-over valve 38 holds a slidable spool 47 in the housing, and the spool 47 is provided with a large-diameter portion 47-a and 47-b, which can be engaged with the housing 46 and a small-diameter portion 47c which serves as an oil path, and is always pressed in the left and right direction through a washer by a spring at its right end portion. At the left end portion of the spool 47, a small-diameter shaft having a notched groove is connected, and a lever 37 engages with the notched groove at its one end and removably engages with notched step portions 35 and 45 at its other end. Therefore, at the end of backward movement of the piston 27 the notched step portion 35 of the shifter 30 moves the lever 37 in a clockwise direction as shown in FIG. 7-a, and the spool 47 of the change-over valve 38 engaging with the lever 37 moves in the left-ward direction against the spring 48 as shown in the figure, and an oil opening 49b communicates with an oil opening 49a. When the shifter 30 moves following the advancement of the piston 27, the force acting on the lever 37 is liberated so that the spool 47 is moved to the right by the spring 48. When the washer pressed by the spring 48 contacts the end cover of the housing 46, the movement of the spool is stopped and the path communicating the oil openings 49a, 49b and 49c is closed (FIG. 7-b).

When the piston 27 approaches the end of its forthward movement, the notched step portion 45 of the shifter 30 rotates the lever 37 in an anti-clockwise direction, and the spool 47 which engages with the lever 37 moves further to the right against the spring 48, so that the communication between the oil openings 49b and 49c is made. As shown in FIG. 8, the gear 23 fixed to the drum-shaped turret 21 engages with a free rotating idle gear 51 through a pin 53 and a bush 52 on the turret supporting base 20, and is driven by a driving device (hydraulic motor 39) having another driving gear 54 which engages with the idle gear 51. As shown in FIG. 9, a reading device for reading the numerical number of the tool holding position is provided on the side face of the turret supporting base 20, and the reading device is provided with limit switches 42a, 42b and 42c for detecting the numerical number. In FIG. 10, the clamp mechanism for determining the position of the drum-shaped turret 21 is shown. At the shaft portion 21c of the drum-shaped turret 21, the position determining bush 56 which is cut corresponding to the outer circumference of the shaft portion 21c is inserted excentrically from the revolving center toward the boring bar, and at the stepped portion of small inside diameter a clamper 55 for pressing the boring bar 26a to be inserted into the hole through the shaft portion 21c is slidably provided. The clamper 55 has a flange portion which contacts the shoulder of the stepped inside diameter, and at the portion of large inside diameter of the bush 56 a position determining pin 57 is provided with its top portion being free in engaging and disengaging. The pin 57 is guided by a guide bush 63 provided on the turret supporting base 20. The small diameter portion 61 of the pin 57 extends through a cam ring 58a, a clamp gear 59 and a cam ring 58b, and these members are restricted in their axial movement prevented by a nut, etc. from coming off the small diameter portion 61.

The clamp gear 59 held on the housing 60 by means of the ring 62 engages with sliding rack 75 provided on the housing 60 shown in FIG. 13, and the lower side and the upper side of the clamp gear 59 contact with the cam ring 58a and the cam ring 58b respectively. FIGS. 11 and 12 show the engagement of the cam portion of the clamp gear 59 with the cam portions of the cam rings 58a and 58b in correspondence to the revolving action of the clamp gear 59. In FIG. 11 the cam projection 64 of the cam ring 58b rides on the cam projection 65 of the clamp gear 59 to lift up the position determining pin 57 and disengage it with the position determining bush 56 of the drum-shaped turret. In FIG. 12, the cam projection 67 of the cam ring 58a is pushed down by the cam projection 66 of the clamp gear 59 so that the pin 57 is moved down to contact with the bush 56 of the drum-shaped turret, and when the clamper 55 is pressed to the boring bar 26a, the inside wall of the bush 56 contacts with the outer circumference of the cylindrical top portion of the pin 57 to determine the indexing position of the turret 21 and effect the clamping. In case where the boring bar 26a is not in the position, the bush 56 is pressed by means of the flange portion of the clamper 55 to effect the index clamping of the turret 21. In this case, the cam rings 58a and 58b are engaged with the press ring 62 and the housing 60 slidably only in the axial direction.

In FIG. 13, the crank gear 59 is engaged with the rack 75 connected to the piston 76, and the piston 76 which moves the rack 75 is inserted slidably in the hydraulic cylinder provided in the housing. Further, a rod 90 is connected with the opposite side of the rack 75 in respect of the piston 76, and a dog 91 fixed at the end of the rod 90 is designed to push a clamp-confirmation limit switch at the end of its stroke. Thus, when the oil pressure is supplied to the oil pressure chamber 77a, the clamp gear 69 performs clamping and the dog 91 pushes the limit switch 80. Also when oil pressure is supplied to the oil pressure chamber 77b the clamp gear 59 performs unclamping.

The functional descriptions of the above embodiment of the present invention will be set forth under. FIG. 14 shows a hydraulic circuit diagram for operating the cross tool head according to one embodiment of the present invention. When SOLb of a solenoid valve 82 in FIG. 14 is energized in accordance with the selection command for the inside or outside diameter cutting tool of the cross tool head 13 by the manual operation disk 17 or by informations of a command-tape, the pressure oil is supplied to the oil pressure chamber 77b through the oil pathes 84b, 84d, a check valve 83b and the oil path 84e and the piston 76 is moved by the oil pressure and at the same time the clamp gear 59 engaging with the rack 75 is rotated in an anticlockwise direction. In this way, the cam projection 65 of the clamp gear 59 pushes upward the cam ring 58b in FIG. 10 while contacting the cam projection 64 so that the position determining pin 57 contacting the position determining bush 56 of the shaft portion 21c is lifted up and liberated from the engagement with the bush 56 (FIG. 11).

Figure 4:
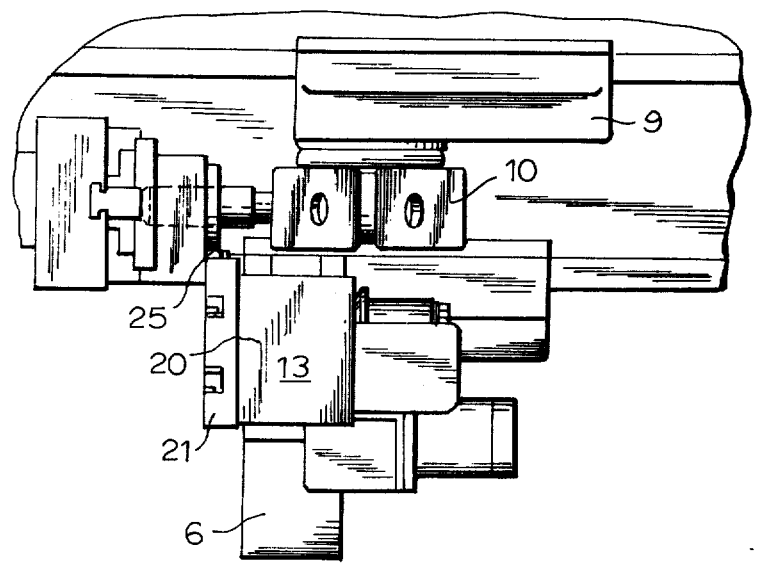
FIGS. 4 and 5 show the tool head arrangements for combined cutting by a cross tool head of the present invention and a turret tool head moving along the main axial line and for inside diameter cutting by the above cross tool head.

Then, the cam ring 58a which has been in contact with the cam projection 66 of the clamp gear 59 gets apart from the cam projection 66. Therefore, the clamping of the boring bar 26a and the drum-shaped turret 21 by the pin 57 is first released, and then the turret 21 is liberated to revolve. On the other hand, when SOLa of the solenoid valve 81 in FIG. 18 is actuated, the pressure oil is supplied to the oil pressure chamber 44a in FIG. 6. Thus, while the boring bar 26a is in the advanced position as in FIG. 8, the boring bar 26a retreats as the piston 27 retreats with the rod 28, the shifter 30 and the block 31. In FIG. 7-a, when the engagement of the notched step portion 35 of the shifter 30 fixed to the rod 28 with one end of the lever 37 attached to the end cover 34 begins near the end of retreat of the boring bar 26a, the spool 47 engaging with the other end of the lever 37 moves to the left in the figure so that the oil opening 49a which has been closed by the large diameter portion 47a is opened and communicates with the oil opening 49b. When the boring bar 26a reaches the end of its retreat, the top of the tool comes to a position slightly behind the front end face of the front large-diameter portion 21a of the drum-shaped turret 21, and in this state, the cutting of the outside diameter or the end facing of a work piece by the tool 25 can be freely done without restriction by the boring bar etc., as shown in FIG. 4. Also, as shown in FIG. 14, the pressure oil supplied to the oil path 84a is supplied to the oil opening 49b of the change-over valve 38 (FIG. 7-a) through the branch point 85c and the oil path 84g so that the oil pressure is supplied to the hydraulic motor 39 in FIG. 6 through the oil pathes 49a, 84j and 84k. The rotation of the hydraulic motor 39 is transmitted to the gear 23 through the driving gear 54 and the idle gear 51 to start the rotation of the drum-shaped turret 21. Further, when the indexing position held by the outside diameter cutting tool 25 is detected by the reading device composed of the dogs 40a, 40b and 40c and the limit switches 42a, 42b and 42c in FIGS. 6 and 9 and is brought to the position X in FIG. 3 along with the revolving of the drum-type turret, SOLb of the solenoid valve 82 in FIG. 14 is de-energized and the oil pressure supplied to the hydraulic motor 39 is connected to the oil path back to the tank, so that the revolving of the turret 21 is stopped.

In this case, the position for giving a command for stopping of the drum-shaped turret 21 may be set in such a way that the axial line of the pin 57 is at a slight angle to the axial line of the bush 56 in the clockwise direction in FIG. 10, namely the reading device is operated slightly in advance to the normal indexing position. In this way, the pin 57 rotates the drum-type turret 21 slightly in the clockwise direction while pressing the head of the clamper 55 inserted in the bush 56, and presses the outer circumference of the pin 57 onto the inside wall of the bush 56 to index the turret 21 to a precise angle and perform clamping.

Detailed operations of the pin 57 are as under. By the de-energization of SOLb of the solenoid valve 82 shown in FIG. 14, the pressure oil is supplied to the oil pressure chamber 77a in FIG. 13 through the oil path 84a so that the clamp gear 59 is rotated in the clockwise direction by the rack 75 and the contact between the cam projection 64 of the cam ring 58b and the cam projection 65 of the clamp gear 59 is released and the cam projection 67 of the cam ring 58a contacts with the cam projection 66 of the clamp gear 59 to push down the pin 57.

Figure 5:
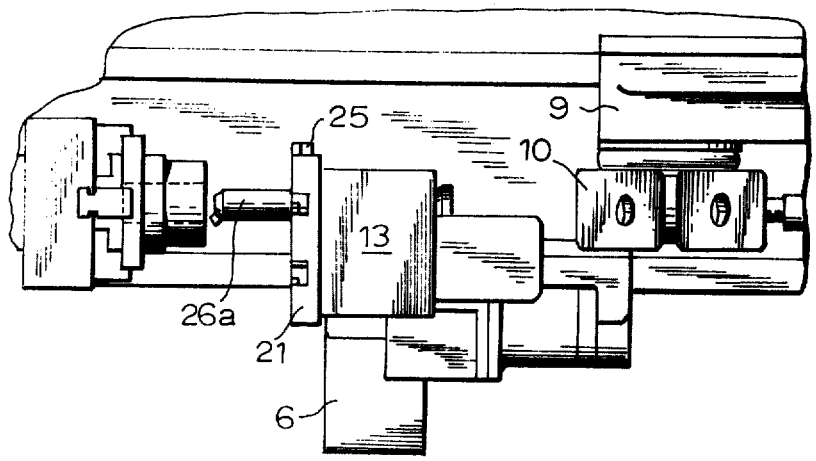

In this way, the pin 57 determines the angular position of the turret 21 while being engaged with the bush 56, and at the same time strong clamping is effected by the contact of the slope 71 of the cam projection 66 with the slope 73 of the cam projection 67. When the position determination and clamping of the drum-type turret 21 is completed, the cross tool head 13 is moved for cutting by the contact of the dog 91 with the clamp-confirmation limit switch 80 in FIG. 13. FIG. 4 shows the manner of the combined cutting of the outside diameter cutting of the work piece by the cross tool head 13 and the drilling by the turret tool head 10. As clearly understood from FIG. 4, the turret tool head 10 can be easily advanced in the clearance formed by the difference between the distance of the axial line of the spindle to the top of the tool 25 and that to the side face of the turret supporting base 20, so that the mutual interference in the combination cutting can be satisfactorily avoided. Next, when it is necessary to perform the finishing cut of the inside diameter by the boring bar 26a, 26b of the cross tool head 13 after the drilling by the turret tool head 10 as shown in FIG. 5, the indexing of the drum-type turret 21 is performed, similarly as the cutting of the outside diameter cutting tool, by the selection command for the inside diameter cutting tool of the cross tool head 13 according to the manual operation panel 17 or the command-tape informations, and SOLa of the solenoid valve 81 in FIG. 14 is de-energized together with SOLb of the solenoid valve 82 shortly before the required boring bar 26a is brought to the position X in FIG. 3. Thus the pressure oil passing through the solenoid valve 81 is supplied to the oil pressure chamber 44 in FIG. 6 through the oil path 84m, and when it acts on the piston 27, the boring bar 26a advances by means of the rod 28, the shifter 30, and the block 31 (FIG. 8). Also, the pressure oil passing through the solenoid valve 82 is supplied to the oil pressure chamber 77a in FIG. 13 through the oil path 84a, and when the clamp gear 59 is rotated by the rack 75 in the clockwise direction, the pin 57 in FIG. 10 performs the indexing of the drum-type turret 21 according to the changes of the modes as shown from FIG. 11 to FIG. 12. In this case, when the oil path 84c is closed by the movement of the piston 76, the tank-returning oil in the oil pressure chamber 77b is exhausted only from the oil path 84e, but as the retarning oil is stopped by the check valve 83b, it passes through the oil opening 49b of the change-over valve 38 in FIG. 7-a and FIG. 7-b via the oil path 84g. In this case also, as the movements of the piston 27 and the piston 76 are started simultaneously, the spool 47 of the change-over valve 38 in FIG. 7-a is already liberated from the restriction by the shifter 30 and is returned to the neutral block position shown in FIG. 7b when the oil path 84c is closed. Thus, the path for the returning oil is closed so that the movement of the piston 76 is stopped once. Meanwhile, the boring bar 26a advances until the block 31 in FIG. 6 reaches the standard face of the standard-size end cover 29 (FIG. 8). When the lever 37 engages with the notched step portion 45 (FIG. 7-a) of the shifter 30 near the end of the advancement of the boring bar 26a and the spool 47 is slide to the right from the state of FIG. 7-b corresponding to the rotation of the lever 37, the oil opening 49b of the change over valve 38 communicates with the oil opening 49c. Thus, the return oil passing through the oil opening 49b is returned to the tank through the oil pathes 84e, 84d and 84b so that the movement of the piston 76 in FIG. 13 is started again, and the pin 57 in FIG. 10 presses the clamper 55 and clamps the boring bar 26a into the hole according to the mode of the above clamping motion and at the same time performs the determination of the indexing position of the turret 21 and the clamping.

Thus, when the indexing and clamping are completed, the dog 91 connected to the piston 76 pushes the clamp-confirmation limit switch 80, and the cross tool head 13 starts the movement for the cutting by the boring bar 26b (FIG. 5).

As described above, the drum-type turret 21 is provided rotatably around the axial line. Parallel to the axial line of the spindle on the cross tool head 13 which is movable in parallel and at right angle to the axial line of the spindle in respect of the spindle of the headstock, a plurality of tools 25 for cutting the outside diameter are provided on the front large diameter portion of the drum-type turret, and further a plurality of boring bars 26 of an inside diameter cutting tool are provided through the drum-type turret, thereby a tool head directed only for drilling, which is movable along the axial line of the spindle is advanced into a clearance formed by the difference in the distance from the axial line of the spindle to the tool 25 and the distance from the axial line of the spindle to the side face of the turret supporting base so that combined cutting or centering can be done freely without interference and thus great advantages can be attained for improving the efficiency and programming of machine tools. Also when the outside diameter cutting is done by the tool 25, the boring bar 26 is housed within the cross tool head 13 so as to avoid interference so that there is no interference at all between the chuck or the work piece and the boring bar or other tools at the time of the outside diameter cutting, and there is no interference at all between the chuck or the work piece and the tool or other boring bars at the time of inside diameter cutting, and a number of tools can be contained very compactly in a single cross tool head. Thus the present invention is also advantageous for lowering the manufacturing cost of the cross tool head. Further, as the cross tool head can contain the boring bars within its inside, there is no interference between the boring bar and the head stock so that it is not necessary to overhang the spindle bearing portion and thus its regidity is not lowered.

What is claimed is:

1. A tool head in a turning machine comprising:
    a turret supporting base mounted on a sliding base movable in parallel and at right angle to a main axial line spindle in respect to an axial line of a spindle,
    a drum-type turret provided on the supporting base so as to effect indexing around an axial line parallel to the main axial line of the supporting base,
    an outside diameter cutting tool provided at a front large-diameter portion of the turret,
    an inside diameter cutting tool provided movable in parallel to the rotating axial line and extending through the turret,
    a power driving device for the indexing of the turret,
    a power driving device which engages with one of the inside diameter cutting tools which is indexed and projects it beyond the front end of the turret and returns it to its original position, and
    a power clamping device which effects clamping for determining the indexing position of the turret and clamping of the required inside diameter cutting tool.

\* \* \* \* \*